United States Patent
Wu et al.

(10) Patent No.: US 10,527,168 B2
(45) Date of Patent: Jan. 7, 2020

(54) SHIFTING EXECUTION MECHANISM FOR DUAL CLUTCH TRANSMISSION

(71) Applicant: Guangzhou Automobile Group Co., Ltd., Guangzhou, Guangdong Province (CN)

(72) Inventors: Jian Wu, Guangzhou (CN); Zilin Yu, Guangzhou (CN); Anwei Zhang, Guangzhou (CN); Xuewu Liu, Guangzhou (CN); Kaorui Zhao, Guangzhou (CN); Fake Shao, Guangzhou (CN); Xiaoming Ling, Guangzhou (CN)

(73) Assignee: GUANGZHOU AUTOMOBILE GROUP CO., LTD., Guangzhou, Gangdong Province (CN)

( * ) Notice: Subject to any disclaimer, the term of this patent is extended or adjusted under 35 U.S.C. 154(b) by 523 days.

(21) Appl. No.: 15/515,597

(22) PCT Filed: Jul. 28, 2015

(86) PCT No.: PCT/CN2015/085257
§ 371 (c)(1),
(2) Date: Mar. 29, 2017

(87) PCT Pub. No.: WO2016/015618
PCT Pub. Date: Feb. 4, 2016

(65) Prior Publication Data
US 2017/0248231 A1 Aug. 31, 2017

(30) Foreign Application Priority Data
Jul. 29, 2014 (CN) .......................... 2014 1 0367855

(51) Int. Cl.
*F16H 63/30* (2006.01)
*F16H 61/30* (2006.01)
*F16H 63/32* (2006.01)

(52) U.S. Cl.
CPC ......... *F16H 63/3023* (2013.01); *F16H 61/30* (2013.01); *F16H 63/30* (2013.01); *F16H 63/32* (2013.01); *F16H 2063/321* (2013.01)

(58) Field of Classification Search
CPC ...... F16H 63/3023; F16H 61/30; F16H 63/30; F16H 63/32; F16H 2063/321
(Continued)

(56) References Cited

U.S. PATENT DOCUMENTS 2,157,592 A * 5/1939 Casler .................... F16H 61/30
74/335
4,170,148 A * 10/1979 Wolfe .................... F16H 63/18
74/337.5

(Continued)

FOREIGN PATENT DOCUMENTS

CN 101328973 A 12/2008
CN 102287518 A 12/2011
(Continued)

*Primary Examiner* — Ha Dinh Ho
(74) *Attorney, Agent, or Firm* — Cheng-Ju Chiang

(57) ABSTRACT

Disclosed is a shifting execution mechanism for a dual clutch transmission, including a front shell, a rear shell, at least two hydraulic cylinders and at least one connecting sleeve. The at least two hydraulic cylinders are mounted along the same axis, two ends of the hydraulic cylinders are clamped between the front shell and the rear shell. Each hydraulic cylinder is mounted with a shifter, a positioning seat, and two sealing plates. Every two adjacent hydraulic cylinders are connected together through one connecting sleeve. A first hydraulic chamber is defined between the connecting sleeve and the sealing plate located adjacent to the connecting sleeve in each hydraulic cylinder. A second (Continued)

hydraulic chamber is defined between the front shell and the sealing plate located adjacent to the front shell. A third hydraulic chamber is defined between the rear shell and the sealing plate located adjacent to the rear shell.

10 Claims, 6 Drawing Sheets

(58) Field of Classification Search
USPC .......................................................... 74/335
See application file for complete search history.

(56) References Cited

U.S. PATENT DOCUMENTS

| | | | | |
|---|---|---|---|---|
| 4,391,158 A * | 7/1983 | Malott | ................... | F16H 63/22 74/337.5 |
| 6,427,548 B1 * | 8/2002 | Leimbach | ............... | F16H 3/089 74/331 |
| 6,634,247 B2 * | 10/2003 | Pels | ........................ | B60K 6/26 74/329 |
| 7,353,726 B2 * | 4/2008 | Beer | .................... | F16H 63/206 74/330 |
| 8,505,403 B2 | 8/2013 | Bowen et al. | | |
| 2006/0201269 A1 * | 9/2006 | Maillard | ................. | F16H 63/22 74/340 |
| 2014/0123797 A1 | 5/2014 | Youn et al. | | |

FOREIGN PATENT DOCUMENTS

| | | |
|---|---|---|
| CN | 102537332 A | 7/2012 |
| CN | 202579974 U | 12/2012 |
| CN | 203962984 U | 11/2014 |
| DE | 102009031730 B3 | 3/2011 |
| DE | 202013103202 U1 | 9/2013 |
| DE | 202013102430 U1 | 10/2013 |

* cited by examiner

SHIFTING EXECUTION MECHANISM FOR DUAL CLUTCH TRANSMISSION

CROSS-REFERENCE TO RELATED APPLICATION

The present application is a 35 U.S.C. § 371 National Phase conversion of International (PCT) Patent Application No. PCT/CN2015/085257, filed on Jul. 28, 2015, the disclosure of which is incorporated by reference herein. The PCT International Patent Application was filed and published in Chinese, and the PCT international patent application claims the priority of Chinese Patent Application No. 201410367855.8, filed by Guangzhou Automobile Group Co., Ltd. on Jul. 29, 2014, and entitled as "SHIFTING EXECUTION MECHANISM FOR DUAL CLUTCH TRANSMISSION". The contents of the above-identified applications are incorporated herein by reference and made a part of this specification.

TECHNICAL FIELD

The present disclosure relates to transmission of automobile, and particularly to a shifting execution mechanism for a dual clutch transmission.

BACKGROUND

Dual clutch transmission (DCT) is a combination of two transmissions and two clutches in a gearbox. Two input shafts are rotatably coupled with each other, with each input shaft being connected with an individual clutch. The two input shafts transmit the power of two speed groups by automatic switching between two clutches during the course of shifting gears. Thus, the gear shifting can be achieved under load, i.e., the power is not interrupted during the gear shifting, to overcome the shortcomings of shift impact with respect to AMT (automated mechanical transmission). During the gear shifting process of vehicle, the power of the engine is always transmitted to wheels, and the gear shifting is quickly and smoothly, not only ensuring the acceleration of the vehicle, but also greatly improving the comfort of the vehicle, because the vehicle does not produce sharp deceleration caused by the shifting.

It is well known, the shifting in the transmission is usually accomplished by a synchronizer, which is connected to and rotated with a corresponding shaft. One side or two sides of the synchronizer is provided with gears having different gear ratios. Under the action of a shift executor, the synchronizer is driven to move axially and engaged with an adjacent gear, such that the gear is coupled to the shaft to realize the synchronization of the gear and the shaft, to thereby output power.

Currently, the shifting execution mechanism for dual clutch transmission using hydraulic oil generally requires a separate layout space for each shifting executor, front and rear ends of the shifting executor need to be positioned on the gearbox housing, thereby requiring a large layout space for the shift executors, increasing the size of the gearbox, and increasing the number of oil paths needed to be manufactured in the gearbox housing. However, it is difficult to manufacture the oil paths in the gearbox housing. And, the shifting executors for different gear stages have different structures, the universality of various parts of the shifting executor is not good.

SUMMARY

In view of the above-mentioned problem, it is necessary to provide a shifting execution mechanism for a dual clutch transmission. The shifting execution mechanism has a compact structure, to thereby save the layout space needed to install the shift executors and reduce the number and difficulty of manufacturing oil paths in the gearbox housing. And, the various parts of the shift executors have good universality.

The present disclosure provides a shifting execution mechanism for a dual clutch transmission in an embodiment. The shifting execution mechanism includes a front shell, a rear shell, at least two hydraulic cylinders, and at least one connecting sleeve. The at least two hydraulic cylinders are mounted along the same axis, two ends of the hydraulic cylinders are clamped between the front shell and the rear shell. Each hydraulic cylinder is mounted with a shifter, a positioning seat and two sealing plates, the two sealing plates are mounted in the hydraulic cylinder and disposed respectively adjacent to two ends of the hydraulic cylinder, the positioning seat is mounted in the hydraulic cylinder and disposed between the two sealing plates. The shifter includes a shifting fork and a connecting plate, the connecting plate extends into the hydraulic cylinder from an outside of the hydraulic cylinder, the connecting plate is located between the two sealing plates and engaged with the positioning seat to form an engagement for restricting movement. Every two adjacent hydraulic cylinders are connected together through one connecting sleeve. A first hydraulic chamber is defined between the connecting sleeve and the sealing plate located adjacent to the connecting sleeve in each hydraulic cylinder, the connecting sleeve is defined with a first oil path in communication with the first hydraulic chamber. A second hydraulic chamber is defined between the front shell and the sealing plate located adjacent to the front shell in the hydraulic cylinder which is connected with the front shell, the front shell is defined with a second oil path in communication with the second hydraulic chamber. A third hydraulic chamber is defined between the rear shell and the sealing plate located adjacent to the rear shell in the hydraulic cylinder which is connected with the rear shell, the rear shell is defined with a third oil path in communication with the third hydraulic chamber.

Further, a slot is defined axially through a middle of each hydraulic cylinder, the connecting plate extends into the hydraulic cylinder via the slot, a top surface of the connecting plate is defined with a W-shaped positioning groove facing the positioning seat, the positioning seat is provided with a stopper element, the stopper element is engaged with the positioning groove.

Further, the positioning seat is provided with an elongated groove, a pole and a torsion spring, the pole is mounted in the elongated groove by the torsion spring, the stopper element is a roller sleeved on the pole, the pole is moveable up and down in the elongated groove during the course of shifting gears.

Further, each hydraulic cylinder is further provided with a barrel, the barrel is mounted in the hydraulic cylinder and located between the two sealing plates, two ends of the barrel respectively abut against the two sealing plates, the barrel defines a hole through a middle thereof, the connecting plate extends through the hole.

Further, an opening is defined in a sidewall of each hydraulic cylinder corresponding to the positioning seat, a securing plate is secured on an outer surface of the sidewall of the hydraulic cylinder around the opening, a top portion of the positioning seat extends out from the opening, the securing plate clamps two end surfaces of the positioning seat.

Further, the shifting execution mechanism further includes a shift shaft, wherein two ends of the shift shaft are respectively mounted on the front shell and the rear shell, each shifter further includes a sleeve pipe, each connecting sleeve is defined with a sleeve hole, the sleeve pipe of each shifter and the sleeve hole of each connecting sleeve are sleeved on the same shift shaft.

Further, a first mounting hole and a second mounting hole are defined respectively at two opposite sides of each connecting sleeve, the front shell is defined with a third mounting hole, one end of the hydraulic cylinder connected with the front shell is mounted in the third mounting hole, and the other end thereof is mounted in the first mounting hole of the connecting sleeve; the rear shell is defined with a fourth mounting hole, one end of the hydraulic cylinder connected with the rear shell is mounted in the fourth mounting hole, and the other end thereof is mounted in the second mounting hole of the connecting sleeve.

Further, an annular groove is defined in an outer surface of each hydraulic cylinder near two ends thereof, each groove is mounted with a seal ring.

Further, the front shell and the rear shell are an integral portion of a gearbox housing.

Further, the front shell and the rear shell are structural parts independent of a gearbox housing, the front shell and the rear shell are respectively mounted to the gearbox housing through fasteners.

In the embodiment, shifting executors for different gears are arranged along the same axis, the multiple hydraulic cylinders arranged along the same axis are provided with the positioning seat, the sealing plates and the oil paths. Each shifter has independent hydraulic system, two or more hydraulic cylinders can be arranged along the same axis. The structure is compact, the space needed for installing the shift executors is greatly saved, the problem of large space occupation of the shift executors is solved. Thus, the gearbox has a smaller size.

In the embodiment, every two adjacent hydraulic cylinders are connected together through a connecting sleeve. It is simple to manufacture oil paths in the connecting sleeve, reducing the number and difficulty of processing oil paths on the gearbox housing.

In the embodiment, the positioning seat is mounted in the hydraulic cylinder. Thus, it is not required to manufacture mounting hole in the gearbox housing for mounting the positioning seat, thereby reducing the difficulty of processing.

In the embodiment, various parts of the shift executor have the same structure and are universal to each other. Therefore, the universality of parts is good, thereby reducing manufacturing and maintenance costs.

DETAILED DESCRIPTION OF PREFERRED EMBODIMENTS

In order to make the purposes, characteristics, and advantages of the present disclosure more apparently, the present disclosure will now be described more specifically with reference to the following embodiments.

Figure 1:
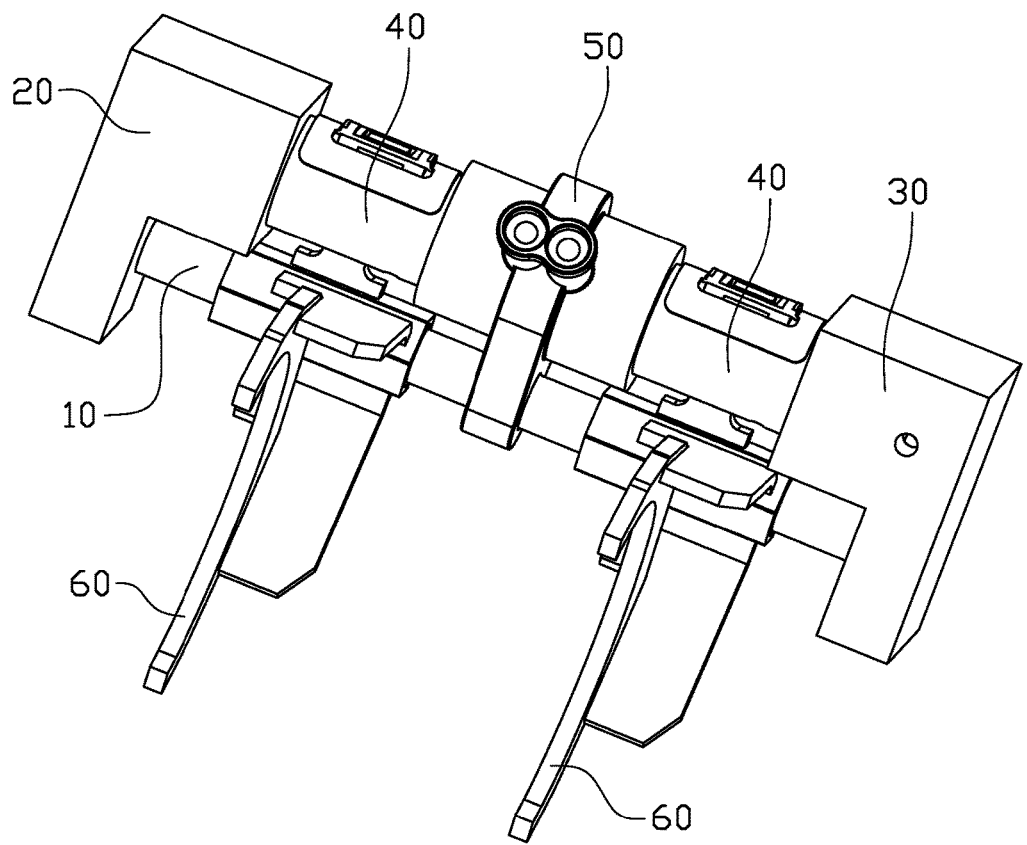
FIG. 1 is an isometric view of a shifting execution mechanism according to an embodiment of the present disclosure.
Figure 2:
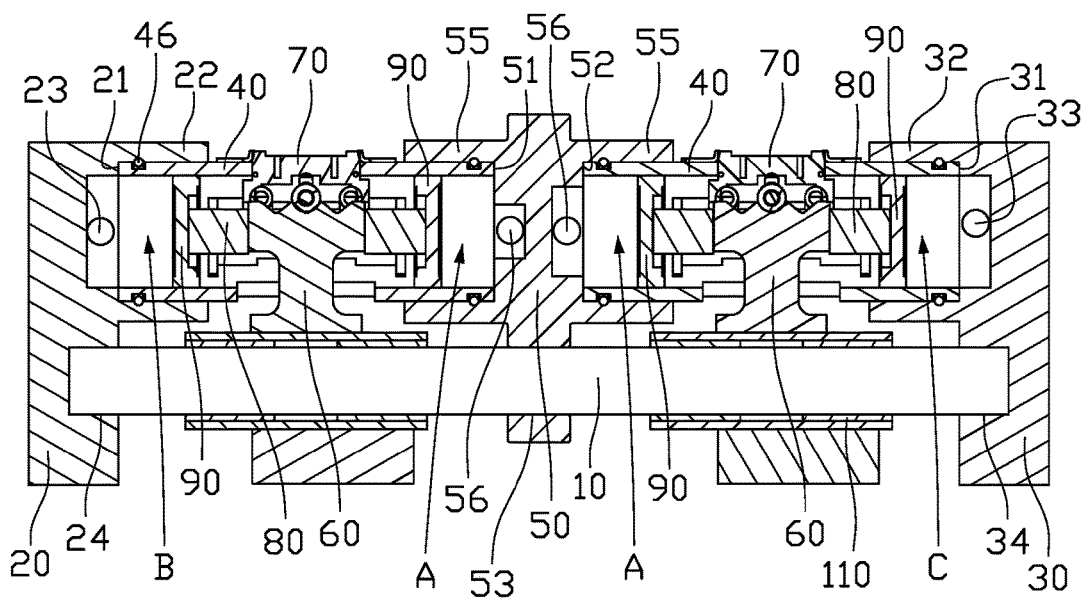
FIG. 2 is a cross sectional view of FIG. 1.

The shifting execution mechanism according to the embodiment of the present disclosure is mainly used in a gearbox using hydraulic oil to drive synchronizers for shifting gears. FIG. 1 is an isometric view of a shifting execution mechanism according to an embodiment of the present disclosure, FIG. 2 is a cross sectional view of FIG. 1, with reference to FIGS. 1-2, the shifting execution mechanism of this embodiment includes a shift shaft 10, a front shell 20, a rear shell 30, at least two hydraulic cylinders 40, and at least one connecting sleeve 50.

The at least two hydraulic cylinders 40 are mounted along the same axis, front end and rear end thereof are clamped between the front shell 20 and the rear shell 30. The shift shaft 10 has two ends respectively mounted on the front shell 20 and the rear shell 30. The connecting sleeve 50 is arranged between every two adjacent hydraulic cylinders 40, and every two adjacent hydraulic cylinders 40 are connected together through the connecting sleeve 50. In the embodiment, two hydraulic cylinders 40 are taken as an example, but it is not limited thereto, the hydraulic cylinders 40 can have more than two.

Each hydraulic cylinder 40 is mounted with a shifter 60, a positioning seat 70, a barrel 80, and two sealing plates 90. The two sealing plates 90 are mounted in the hydraulic cylinder 40 and disposed respectively adjacent to two ends of the hydraulic cylinder 40. The positioning seat 70 is mounted in the hydraulic cylinder 40 and disposed between the two sealing plates 90.

Figure 3:
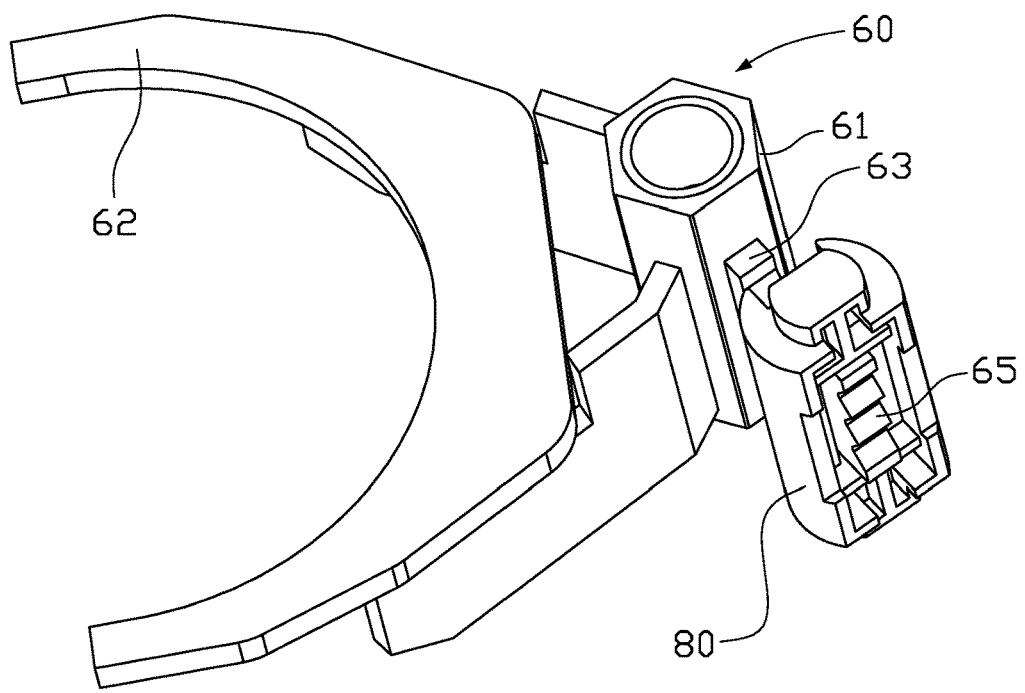
FIG. 3 is an assembled view of the shifter and the barrel.
Figure 4:
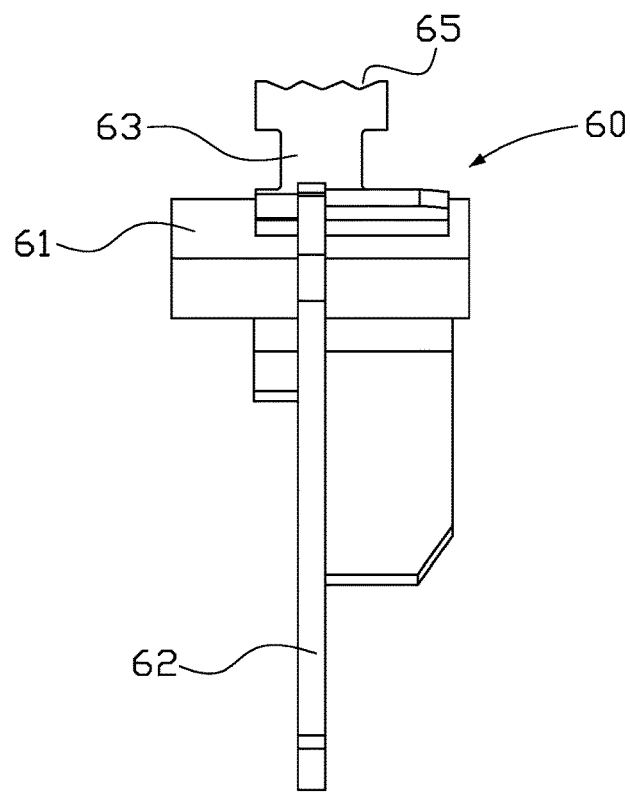
FIG. 4 is a front view of the shifter.

FIG. 3 is an assembled view of the shifter 60 and the barrel 80, FIG. 4 is a front view of the shifter 60, with reference to FIGS. 3-4, the shifter 60 includes a sleeve pipe 61, a shifting fork 62, and a connecting plate 63. A top surface of the connecting plate 63 is defined with a W-shaped positioning groove 65 facing the positioning seat 70. The connecting plate 63 extends into the hydraulic cylinder 40 from an outside of the hydraulic cylinder 40, the connecting plate 63 is located between the two sealing plates 90 and engaged with the positioning seat 70 to form an engagement for restricting movement (FIG. 2). The sleeve pipe 61 is sleeved on the shift shaft 10. The shifting fork 62 is used for engaging with a synchronizer (not shown). Generally, the synchronizer defines a groove at a circumference thereof, and the shifting fork 62 engages in the groove, so that the shifter 60 can drive the synchronizer to move axially.

Figure 5:
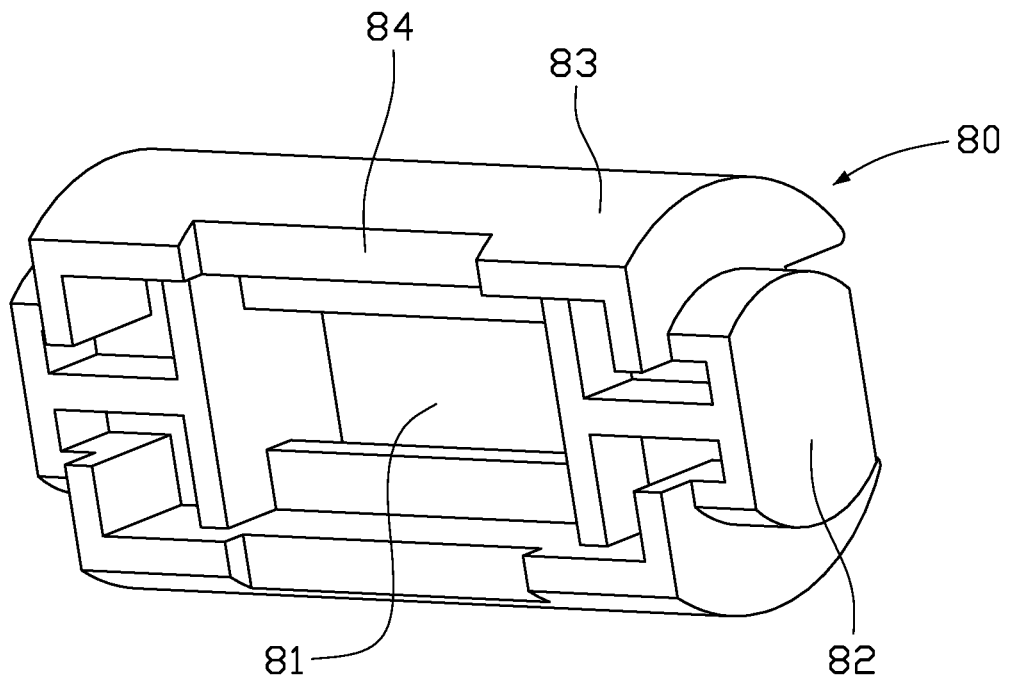
FIG. 5 is an isometric view of the barrel.

The barrel 80 is mounted in the hydraulic cylinder 40 and located between the two sealing plates 90. Two ends of the barrel 80 respectively abut against the two sealing plates 90. FIG. 5 is an isometric view of the barrel 80, with reference to FIG. 5, the barrel 80 defines a hole 81 through a middle thereof. The barrel 80 is mounted to the connecting plate 63 of the shifter 60 via the hole 81 (FIG. 3). The connecting plate 63 extends through the hole 81 and then engages with the positioning seat 70 to form engagement (FIG. 2). Two ends of the barrel 80 extend respectively outwardly to form an abutting portion 82, the two abutting portions 82 abut against the inner surfaces of the two sealing plates 90, respectively. Further, the barrel 80 is formed with arc-shaped supporting surfaces 83 at front and rear sides thereof. When the barrel 80 is mounted in the hydraulic cylinder 40, the supporting surfaces 83 at the front and rear sides abut against an inner surface 41 (FIG. 9) of the hydraulic cylinder 40, such that the barrel 80 can move left and right stably. The barrel 80 is provided with U-shaped cutouts 84 at top and bottom sides thereof.

Figure 6:
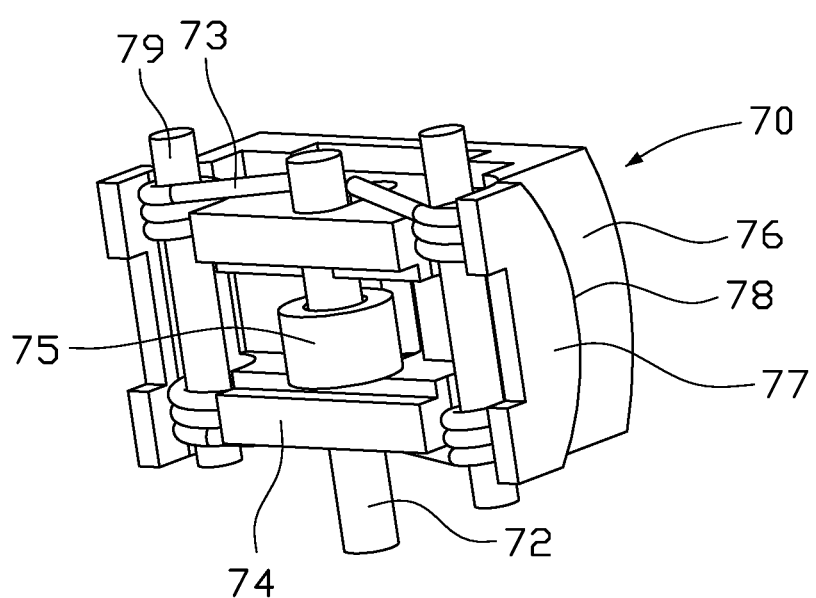
FIG. 6 is an isometric view of the positioning seat.
Figure 7:
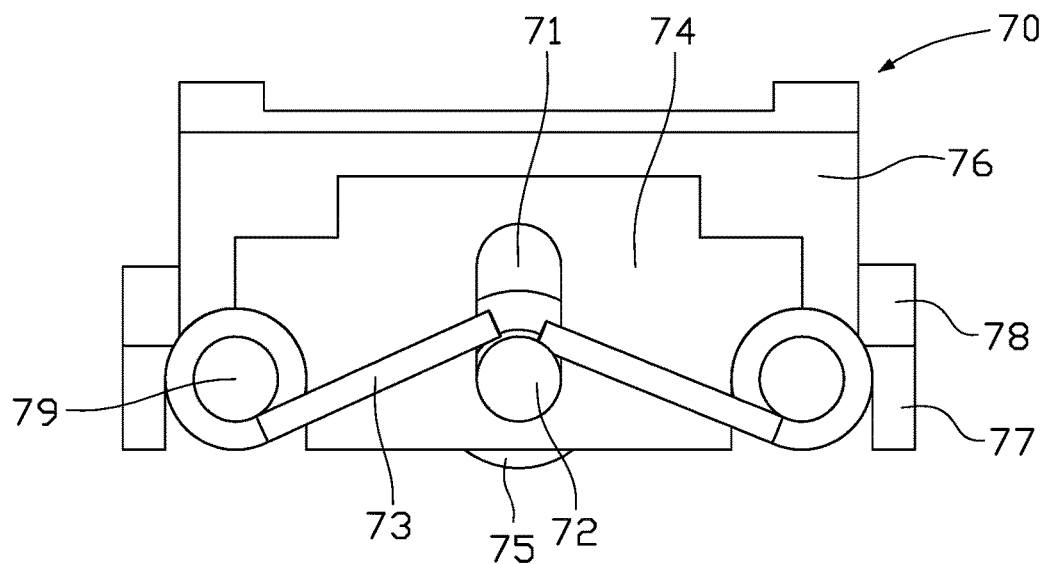
FIG. 7 is a front view of FIG. 6.

FIG. 6 is an isometric view of the positioning seat 70, FIG. 7 is a front view of FIG. 6, with reference to FIGS. 6-7, the positioning seat 70 is provided with an elongated groove 71, a pole 72, and a torsion spring 73. The elongated groove 71 is defined laterally through front and rear side plates 74 of the positioning seat 70. The elongated groove 71 is has an elongated profile from top to bottom. The pole 72 is mounted in the elongated groove 71 by the torsion spring 73. A roller 75 is sleeved on the pole 72, and the roller 75 can rotate around the pole 72. The roller 75 is engaged with the W-shaped positioning groove 65 of the connecting plate 63 of the shifter 60. In the course of shifting gears using the shifter 60, the positioning groove 65 can position the shifting fork 62 at gear stages and the neutral through the roller 75. The torsion spring 73 can have more than one and arranged at two side of the pole 72. Multiple torsion springs 73 are mounted respectively on two mounting shafts 79 of the positioning seat 70. The free ends of the torsion springs 73 are engaged with the pole 72. During the course of shifting gears by using the shifting fork 62 to drive the synchronizer, the positioning groove 65 can, via the roller 75, pushes and compresses the torsion spring 73, to cause the pole 72 to move up and down in the elongated groove 71. When the positioning seat 70 and the barrel 80 are assembled, the two mounting shafts 79 are received in the U-shaped cutouts 84 of the barrel 80. When the barrel 80 moves left and right, the two mounting shafts 79 can move within the U-shaped cutouts 84. Further, the positioning seat 70 includes left and right end surfaces 76, and a protrusion 77 extends outwards from a lower portion of each end surface 76. The protrusion 77 and the end surface 76 are connected to form an arc-shaped surface 78. When the positioning seat 70 is mounted in the hydraulic cylinder 40, the arc-shaped surface 78 abuts against the inner surface 41 (FIG. 9) of the hydraulic cylinder 40 to achieve positioning effect.

Figure 8:
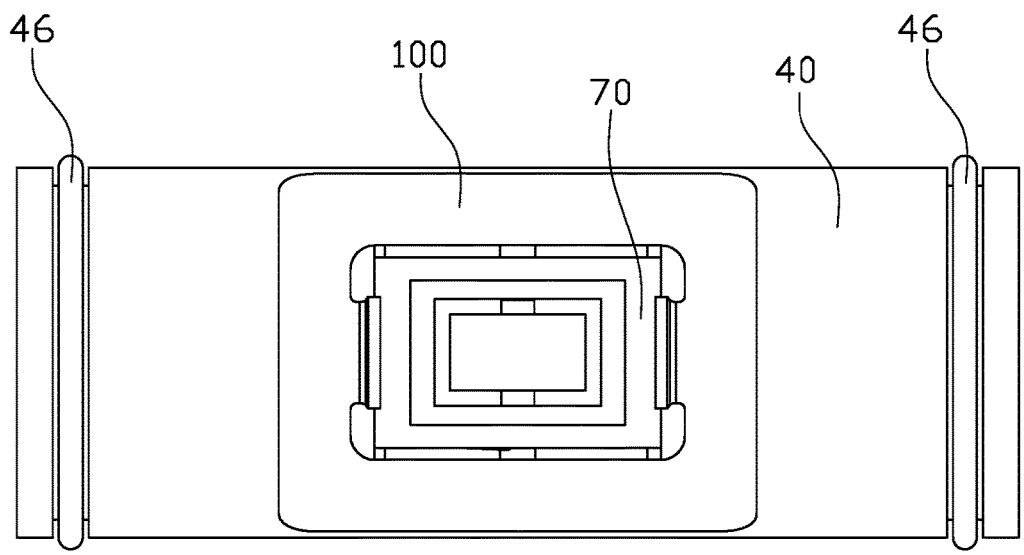
FIG. 8 is an assembled view of the hydraulic cylinder, the positioning seat and the barrel.
Figure 9:
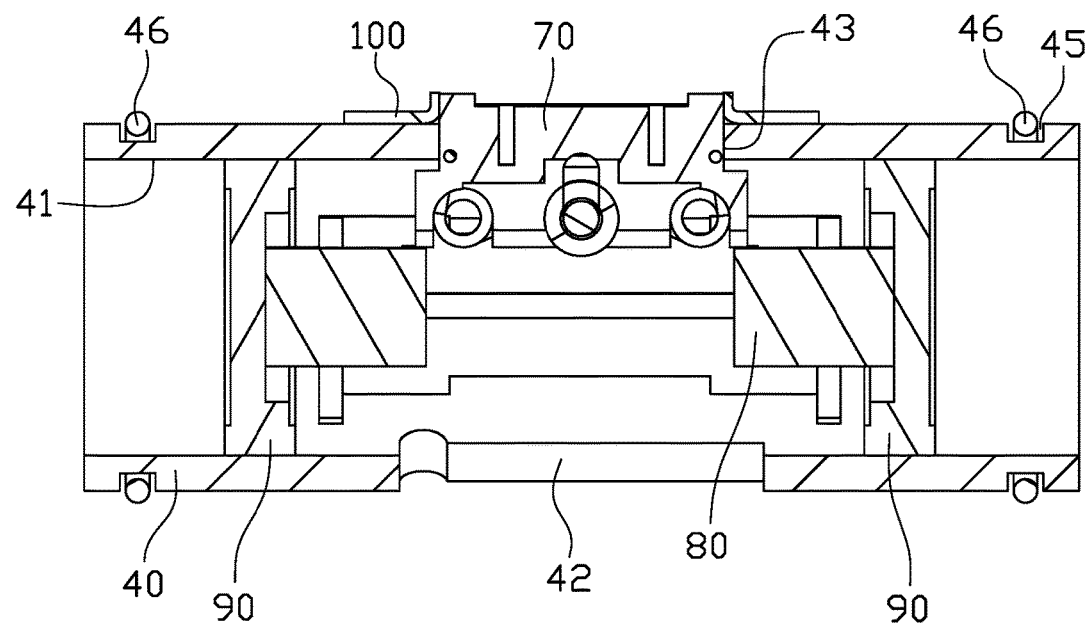
FIG. 9 is a cross sectional view of FIG. 8.

FIG. 8 is an assembled view of the hydraulic cylinder 40, the positioning seat 70 and the barrel 80, FIG. 9 is a cross sectional view of FIG. 8, with reference to FIGS. 8-9, a slot 42 is defined axially through a middle of each hydraulic cylinder 40. The connecting plate 63 of the shifter 60 extends into the hydraulic cylinder 40 via the slot 42. The positioning seat 70 faces towards the slot 42. An opening 43 is defined in a sidewall of each hydraulic cylinder 40 corresponding to the positioning seat 70. A securing plate 100 is secured by welding on an outer surface of the sidewall of the hydraulic cylinder 40 around the opening 43. A top portion of the positioning seat 70 extends out from the opening 43. The securing plate 100 clamps the two end surfaces 76 of the positioning seat 70. The protrusion 77 of the positioning seat 70 is located inside the hydraulic cylinder 40, with the arc-shaped surface 78 of the protrusion 77 abutting against the inner surface 41 of the hydraulic cylinder 40, to thereby mount the positioning seat 70 in the hydraulic cylinder 40. It is understood that, the positioning seat 70 can also be mounted in the hydraulic cylinder 40 by fasteners or by clamping. An annular groove 45 is defined in the outer surface of each hydraulic cylinder 40 near two ends thereof. Each groove 45 is mounted with a seal ring 46.

Figure 10:
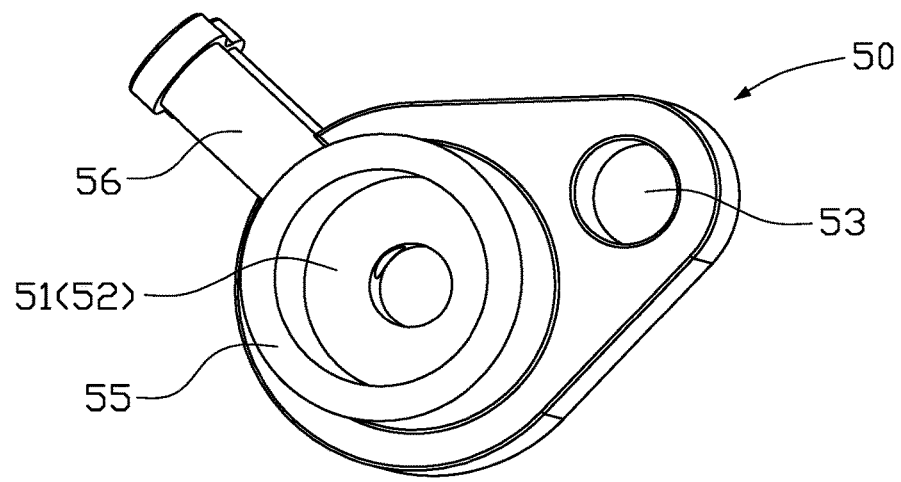
FIG. 10 is an isometric view of the connecting sleeve.

FIG. 10 is an isometric view of the connecting sleeve 50, with reference to FIG. 10, a first mounting hole 51 and a second mounting hole 52 are defined at two opposite sides of each connecting sleeve 50. The first mounting hole 51 and the second mounting hole 52 are respectively defined in two cylinders 55 formed on left and right sides of the connecting sleeve 50. The first mounting hole 51 and the second mounting hole 52 are symmetrically arranged on the connecting sleeve 50 in the left-to-right direction. Further, a sleeve hole 53 is defined in the connecting sleeve 50 away from the two mounting holes 51, 52.

As shown in FIG. 2, the front shell 20 is defined with a third mounting hole 21. The third mounting hole 21 is defined in a cylinder 22 which extends from the front shell 20 towards the rear shell 30. One end of the hydraulic cylinder 40 connected with the front shell 20 (i.e., the left hydraulic cylinder 40 in the embodiment) is mounted in the third mounting hole 21 of the front shell 20, and the other end thereof is mounted in the first mounting hole 51 of the connecting sleeve 50. The rear shell 30 is defined with a fourth mounting hole 31. The fourth mounting hole 31 is defined in a cylinder 32 which extends from the rear shell 30 towards the front shell 20. One end of the hydraulic cylinder 40 connected with the rear shell 30 (i.e., the right hydraulic cylinder 40 in the embodiment) is mounted in the fourth mounting hole 31 of the rear shell 30, and the other end thereof is mounted in the second mounting hole 52 of the connecting sleeve 50. Thus, when the front shell 20 and the rear shell 30 are assembled together, the hydraulic cylinders 40 and the connecting sleeve 50 are firmly clamped together and cannot move.

A first hydraulic chamber A is hermetically defined between the connecting sleeve 50 and the sealing plate 90 located adjacent to the connecting sleeve 50 of each hydraulic cylinder 40. The connecting sleeve 50 defines a first oil path 56 in communication with the first hydraulic chamber A. In the embodiment, the connecting sleeve 50 is defined with two first oil paths 56, the two first oil paths 56 are isolated and not communicated with each other. The first oil path 56 on the left side of the connecting sleeve 50 is communicated with the first hydraulic chamber A of the left hydraulic cylinder 40. The first oil path 56 on the right side of the connecting sleeve 50 is communicated with the first hydraulic chamber A of the right hydraulic cylinder 40. A second hydraulic chamber B is hermetically defined between the front shell 20 and the sealing plate 90 located adjacent to the front shell 20 in the hydraulic cylinder 40 which is connected with the front shell 20 (i.e., the left hydraulic cylinder 40 in the embodiment). The front shell 20 defines a second oil path 23 in communication with the second hydraulic chamber B. A third hydraulic chamber C is hermetically defined between the rear shell 30 and the sealing plate 90 located adjacent to the rear shell 30 of the hydraulic cylinder 40 which is connected with the rear shell 30 (i.e., the right hydraulic cylinder 40 in the embodiment). The rear shell 30 defines a third oil path 33 in communication with the third hydraulic chamber C. Thus, the front shell 20, the left hydraulic cylinder 40 and the connecting sleeve 50 cooperatively form an independent hydraulic system for controlling the movement of the left shifter 60. The rear shell 30, the right hydraulic cylinder 40 and the connecting sleeve 50 cooperatively form another independent hydraulic system for controlling the movement of the right shifter 60. The seal rings 46 mounted in the outer surface of each hydraulic cylinder 40 can ensure the hydraulic chamber B defined between the left hydraulic cylinder 40 and the front shell 20, the hydraulic chamber C defined between the right hydraulic cylinder 40 and the rear shell 30, and the hydraulic chamber A defined between each hydraulic cylinder 40 and the connecting sleeve 50 to be sealed hermetically.

Two ends of the shift shaft 10 are mounted in mounting holes 24, 34 defined in the front shell 20 and the rear shell 30, respectively. The sleeve pipe 61 of each shifter 60 and the sleeve hole 53 of each connecting sleeve 50 are sleeved on the same shift shaft 10. A lubrication sleeve 110 is further mounted in the sleeve pipe 61 of each shifter 60, to cause the shifter 60 to move along the shift shaft 10 more smoothly. The shift shaft 10 passes through the lubrication sleeve 110, the two ends of the shift shaft 10 are inserted into the mounting holes 24, 34 of the front shell 20 and the rear shell 30, so that the shift shaft 10 cannot move axially and rotate.

Figure 11:
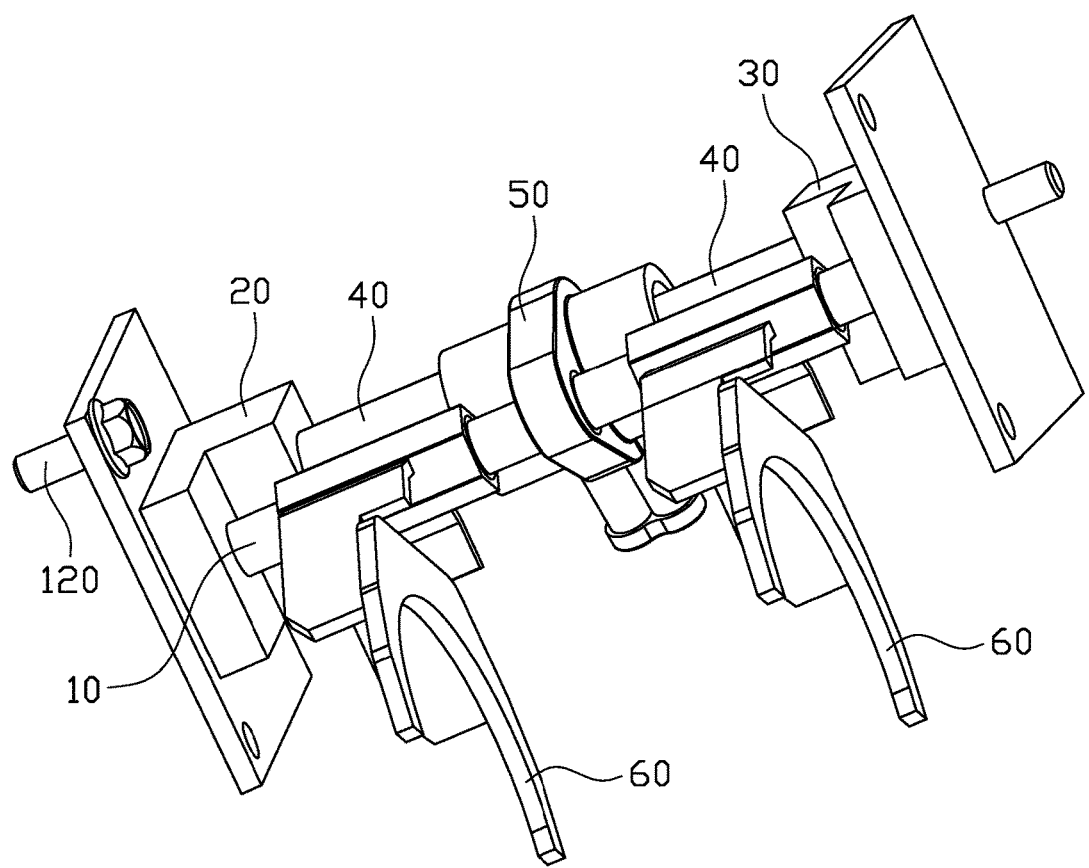
FIG. 11 is an alternative structure of FIG. 1.

The front shell 20 and the rear shell 30 can be an integral portion of a gearbox housing. It is understood that, as shown in FIG. 11, the front shell 20 and the rear shell 30 can also be structural parts independent of the gearbox housing, and the front shell 20 and the rear shell 30 can be mounted to the gearbox housing (not shown) through fasteners, such as, screws 120.

The working principle of the shifting execution mechanism is as follows:

As shown in FIG. 2, when the hydraulic oil enters into the hydraulic chamber B between the hydraulic cylinder 40 and the front shell 20 from the second oil path 23 of the front shell 20, the hydraulic oil pushes the left sealing plate 90 in the hydraulic cylinder 40 to move right, and the sealing plate 90 continues to push the barrel 80 to move right. The barrel 80 carries the connecting plate 63 of the shifter 60, and accordingly causes the shifting fork 62 to move right, to thereby drive the synchronizer (not shown) moving for shifting gears. Meanwhile, the barrel 80 pushes the right sealing plate 90 in the hydraulic cylinder 40 to move right, such that the hydraulic oil in the hydraulic chamber A between the hydraulic cylinder 40 and the connecting sleeve 50 is discharged out from the first oil path 56 of the connecting sleeve 50. In the course of shifting gears, the roller 75 moves from the middle groove to the left groove of the W-shaped positioning groove 65 of the connecting plate 63.

Similarly, when the hydraulic oil enters into the hydraulic chamber A between the hydraulic cylinder 40 and the connecting sleeve 50 from the first oil path 56 of the connecting sleeve 50, the hydraulic oil pushes the right sealing plate 90 in the hydraulic cylinder 40 to move left, and the sealing plate 90 continues to push the barrel 80 to move left. The barrel 80 carries the connecting plate 63 of the shifter 60, and accordingly causes the shifting fork 62 to move left, to thereby drive the synchronizer (not shown) moving for shifting gears. Meanwhile, the barrel 80 pushes the left sealing plate 90 in the hydraulic cylinder 40 to move left, such that the hydraulic oil in the hydraulic chamber B between the hydraulic cylinder 40 and the front shell 20 is discharged out from the second oil path 23 of the front shell 20. In the course of shifting gears, the roller 75 moves from the middle groove to the right groove of the W-shaped positioning groove 65 of the connecting plate 63.

When the hydraulic oil enters from the third oil path 33 of the rear shell 30 for shifting gears, the working principle of the shifting execution mechanism is the same as the above, and is not repeated here for clarity.

It is understood that, the barrel 80 is provided in each hydraulic cylinder 40 in the embodiment, the pushing force of the hydraulic oil is transmitted, via the barrel 80, from one sealing plate 90 to the connecting plate 63, and then to the other sealing plate 90. The barrel 80 can be made by injection molding, with simple processing and assembly. However, the barrel 80 can be replaced with other structural forms, for example, each sealing plate 90 can be made into T-shaped profile, with the elongated rod of the T-shaped sealing plate 90 abutting against the connecting plate 63 to push the connecting plate 63 moving left and right. Further, when the assembly requirements are met, the top portion of the connecting plate 63 can be widened, with two ends of the connecting plate 63 directly abutting against the two sealing plates 90, respectively.

It is understood that, the roller 75 is the stopper element used for engaging with the W-shaped positioning groove 65 in the embodiment, and the torsion spring 73 is the elastic member for providing compression force, but it is not limited thereto. The roller 75 can be replaced by other stopper elements, such as balls, and the torsion spring 73 can be replaced by other elastic members, such as coil springs.

In the embodiment, shifting executors for different gears are arranged along the same axis, the multiple hydraulic cylinders arranged along the same axis are provided with the positioning seat, the sealing plates and the oil paths. Each shifter has independent hydraulic system, two or more hydraulic cylinders can be arranged along the same axis. The structure is compact, the space needed for installing the shift executors is greatly saved, the problem of large space occupation of the shift executors is solved. Thus, the gearbox has a smaller size.

In the embodiment, every two adjacent hydraulic cylinders are connected together through a connecting sleeve. It is simple to manufacture oil paths in the connecting sleeve, reducing the number and difficulty of processing oil paths on the gearbox housing.

In the embodiment, the positioning seat is mounted in the hydraulic cylinder. Thus, it is not required to manufacture mounting hole in the gearbox housing for mounting the positioning seat, thereby reducing the difficulty of processing.

In the embodiment, various parts of the shift executor have the same structure and are universal to each other. Therefore, the universality of parts is good, thereby reducing manufacturing and maintenance costs.

In this description, the term "include", or any of its variants, is intended to cover non-exclusive inclusion, except for the elements listed, also including other elements that are not explicitly listed.

In this description, the orientation words "front", "back", "up", "down", "left", "right", etc., are defined by the position of the parts in the drawing for the purpose of clarity and convenience. It is understood that, the orientation words should not be deemed as limitations to the scope of the present disclosure.

In the case of no conflict, the above examples and the features in the examples can be combined with each other.

The above are embodiments of the present disclosure only, and should not be deemed as limitations to the scope of the present disclosure. It should be noted that variations and improvements will become apparent to those skilled in the art to which the present disclosure pertains. Therefore, the scope of the present disclosure is defined by the appended claims.

INDUSTRIAL APPLICABILITY

In the embodiment, shifting executors for different gears are arranged along the same axis, the multiple hydraulic cylinders arranged along the same axis are provided with the positioning seat, the sealing plates and the oil paths. Each shifter has independent hydraulic system, two or more hydraulic cylinders can be arranged along the same axis. The structure is compact, the space needed for installing the shift executors is greatly saved, the problem of large space occupation of the shift executors is solved. Thus, the gearbox has a smaller size. Every two adjacent hydraulic cylinders are connected together through a connecting sleeve. It is simple to manufacture oil paths in the connecting sleeve, reducing the number and difficulty of processing oil paths on the gearbox housing. The positioning seat is mounted in the hydraulic cylinder. Thus, it is not required to manufacture mounting hole in the gearbox housing for mounting the positioning seat, thereby reducing the difficulty of processing. Various parts of the shift executor have the same structure and are universal to each other. Therefore, the universality of parts is good, thereby reducing manufacturing and maintenance costs.

What is claimed is:

1. A shifting execution mechanism for a dual clutch transmission, comprising:
   a front shell, a rear shell, at least two hydraulic cylinders, and at least one connecting sleeve;
   wherein the at least two hydraulic cylinders are mounted along the same axis, two ends of the hydraulic cylinders are clamped between the front shell and the rear shell;
   wherein each hydraulic cylinder is mounted with a shifter, a positioning seat and two sealing plates, the two sealing plates are mounted in the hydraulic cylinder and disposed respectively adjacent to two ends of the hydraulic cylinder, the positioning seat is mounted in the hydraulic cylinder and disposed between the two sealing plates;
   wherein the shifter includes a shifting fork and a connecting plate, the connecting plate extends into the hydraulic cylinder from an outside of the hydraulic cylinder, the connecting plate is located between the two sealing plates and engaged with the positioning seat to form an engagement for restricting movement;
   wherein every two adjacent hydraulic cylinders are connected together through one connecting sleeve;
   wherein a first hydraulic chamber is defined between the connecting sleeve and the sealing plate located adjacent to the connecting sleeve in each hydraulic cylinder, the connecting sleeve is defined with a first oil path in communication with the first hydraulic chamber;
   wherein a second hydraulic chamber is defined between the front shell and the sealing plate located adjacent to the front shell in the hydraulic cylinder which is connected with the front shell, the front shell is defined with a second oil path in communication with the second hydraulic chamber;
   wherein a third hydraulic chamber is defined between the rear shell and the sealing plate located adjacent to the rear shell in the hydraulic cylinder which is connected with the rear shell (30), the rear shell is defined with a third oil path in communication with the third hydraulic chamber.

2. The shifting execution mechanism of claim 1, wherein a slot is defined axially through a middle of each hydraulic cylinder, the connecting plate extends into the hydraulic cylinder via the slot, a top surface of the connecting plate is defined with a W-shaped positioning groove facing the positioning seat, the positioning seat is provided with a stopper element, the stopper element is engaged with the positioning groove.

3. The shifting execution mechanism of claim 2, wherein the positioning seat is provided with an elongated groove, a pole and a torsion spring, the pole is mounted in the elongated groove by the torsion spring, the stopper element is a roller sleeved on the pole, the pole is moveable up and down in the elongated groove during the course of shifting gears.

4. The shifting execution mechanism of claim 1, wherein each hydraulic cylinder is further provided with a barrel, the barrel is mounted in the hydraulic cylinder and located between the two sealing plates, two ends of the barrel respectively abut against the two sealing plates, the barrel defines a hole through a middle thereof, the connecting plate extends through the hole.

5. The shifting execution mechanism of claim 1, wherein an opening is defined in a sidewall of each hydraulic cylinder corresponding to the positioning seat, a securing plate is secured on an outer surface of the sidewall of the hydraulic cylinder around the opening, a top portion of the positioning seat extends out from the opening, the securing plate clamps two end surfaces of the positioning seat.

6. The shifting execution mechanism of claim 1, further comprising a shift shaft, wherein two ends of the shift shaft are respectively mounted on the front shell and the rear shell, each shifter further includes a sleeve pipe, each connecting sleeve is defined with a sleeve hole, the sleeve pipe of each shifter and the sleeve hole of each connecting sleeve are sleeved on the same shift shaft.

7. The shifting execution mechanism of claim 1, wherein a first mounting hole and a second mounting hole are defined respectively at two opposite sides of each connecting sleeve, the front shell is defined with a third mounting hole, one end of the hydraulic cylinder connected with the front shell is mounted in the third mounting hole, and the other end thereof is mounted in the first mounting hole of the connecting sleeve; the rear shell is defined with a fourth mounting hole, one end of the hydraulic cylinder connected with the rear shell is mounted in the fourth mounting hole, and the other end thereof is mounted in the second mounting hole of the connecting sleeve.

8. The shifting execution mechanism of claim 7, wherein an annular groove is defined in an outer surface of each hydraulic cylinder near two ends thereof, each groove is mounted with a seal ring.

9. The shifting execution mechanism of claim 7, wherein the front shell and the rear shell are an integral portion of a gearbox housing.

10. The shifting execution mechanism of claim 7, wherein the front shell and the rear shell are structural parts independent of a gearbox housing, the front shell and the rear shell are respectively mounted to the gearbox housing through fasteners.

* * * * *